United States Patent
Langseth et al.

(10) Patent No.: US 9,811,567 B2
(45) Date of Patent: *Nov. 7, 2017

(54) PRIORITIZATION OF RETRIEVAL AND/OR PROCESSING OF DATA

(71) Applicant: Zoomdata, Inc., Reston, VA (US)

(72) Inventors: Justin Langseth, Great Falls, VA (US);
Jorge Alarcon, Fairfax, VA (US);
Ruhollah Farchtchi, Vienna, VA (US);
Farzad Aref, McLean, VA (US)

(73) Assignee: ZOOMDATA, INC., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/010,986

(22) Filed: Jan. 29, 2016

(65) Prior Publication Data
US 2016/0253326 A1 Sep. 1, 2016

Related U.S. Application Data

(63) Continuation of application No. 14/634,680, filed on Feb. 27, 2015, now Pat. No. 9,251,276.

(51) Int. Cl.
*G06F 17/30* (2006.01)

(52) U.S. Cl.
CPC .... *G06F 17/3053* (2013.01); *G06F 17/30442* (2013.01); *G06F 17/30477* (2013.01);
(Continued)

(58) Field of Classification Search
CPC ......... G06F 17/30867; G06F 17/30893; G06F 17/30545; G06F 17/30702; G06F 17/30958
(Continued)

(56) References Cited

U.S. PATENT DOCUMENTS

| | | |
|---|---|---|
| 4,769,772 A | 9/1988 | Dwyer |
| 6,026,397 A | 2/2000 | Sheppard |

(Continued)

FOREIGN PATENT DOCUMENTS

| | | |
|---|---|---|
| CN | 103412922 A | 11/2013 |
| CN | 105677511 A | 6/2016 |

(Continued)

OTHER PUBLICATIONS

Bennett et al., "Feature-Based Statistical Analysis of Combustion Simulation Data", IEEE Transactions on Visualization and Computer Graphics, vol. 17, No. 12, Dec. 2011, pp. 1822-1831 (10 pages).

(Continued)

*Primary Examiner* — Frantz Coby
(74) *Attorney, Agent, or Firm* — Pillsbury Winthrop Shaw Pittman LLP

(57) ABSTRACT

Systems and methods of prioritizing retrieval and/or processing of data related to a subset of attributes based on a prediction of associated values are presented herein. In certain implementations, a request for values associated with respective first attributes may be received. Based on the request, first queries for data related to the first attributes may be performed. Based on the first queries, a first subset of data related to calculating at least some of the associated values may be received. At least some of the associated values may be predicted based on the first subset of data. Based on the prediction of the associated values, retrieval and/or processing of data related to a first subset of the first attributes may be prioritized over retrieval and/or processing of data related to one or more other subsets of the first attributes.

20 Claims, 7 Drawing Sheets

(52) U.S. Cl.
CPC .. *G06F 17/30554* (2013.01); *G06F 17/30893* (2013.01); *G06F 17/30545* (2013.01); *G06F 17/30702* (2013.01); *G06F 17/30902* (2013.01); *G06F 17/30958* (2013.01)

(58) Field of Classification Search
USPC .................. 707/723, 736, 769, 722, 770
See application file for complete search history.

(56) References Cited

U.S. PATENT DOCUMENTS

| | | | |
|---|---|---|---|
| 6,072,493 A | 6/2000 | Driskell et al. | |
| 6,505,246 B1 | 1/2003 | Land et al. | |
| 6,519,604 B1 | 2/2003 | Acharya et al. | |
| 6,633,873 B1 | 10/2003 | Nakamura | |
| 7,155,475 B2 | 12/2006 | Agnoli et al. | |
| 7,308,445 B2 | 12/2007 | Bharat et al. | |
| 7,333,974 B2 | 2/2008 | Patterson | |
| 7,340,409 B1 | 3/2008 | Ulwick | |
| 7,373,389 B2 | 5/2008 | Rosenbaum et al. | |
| 7,467,131 B1 | 12/2008 | Gharachorloo et al. | |
| 7,502,366 B1 | 3/2009 | Erimli et al. | |
| 7,543,061 B2 | 6/2009 | Kumbalimutt et al. | |
| 7,580,941 B2 | 8/2009 | Narasayya et al. | |
| 7,673,278 B2 | 3/2010 | Rathsack et al. | |
| 7,680,781 B1 | 3/2010 | Wasserman et al. | |
| 7,688,322 B2 | 3/2010 | Kapler et al. | |
| 7,693,816 B2 | 4/2010 | Nemoto et al. | |
| 7,761,324 B2 | 7/2010 | Amerasinghe et al. | |
| 7,792,835 B2 | 9/2010 | Bohannon et al. | |
| 7,814,042 B2 | 10/2010 | Ahmed | |
| 7,822,658 B2 * | 10/2010 | Casati .................... | G06Q 10/10 705/35 |
| 8,027,854 B2 | 9/2011 | Baggett et al. | |
| 8,028,314 B1 | 9/2011 | Sezan et al. | |
| 8,090,715 B2 | 1/2012 | Matias | |
| 8,095,935 B2 | 1/2012 | Paramasivam et al. | |
| 8,122,223 B2 | 2/2012 | Cantin et al. | |
| 8,140,698 B2 | 3/2012 | Codella et al. | |
| 8,180,720 B1 | 5/2012 | Kovacs et al. | |
| 8,489,982 B2 | 7/2013 | Davis | |
| 8,521,574 B1 | 8/2013 | Rajan et al. | |
| 8,539,565 B2 | 9/2013 | Beletski et al. | |
| 8,542,117 B1 | 9/2013 | Miasnik et al. | |
| 8,566,788 B2 | 10/2013 | Snodgrass et al. | |
| 8,589,503 B2 | 11/2013 | Alperovitch et al. | |
| 8,631,325 B1 | 1/2014 | Langseth et al. | |
| 8,849,730 B2 * | 9/2014 | Winn .................. | G06F 17/30702 706/12 |
| 8,892,638 B2 | 11/2014 | Chang et al. | |
| 8,938,688 B2 | 1/2015 | Bradford et al. | |
| 8,959,108 B2 | 2/2015 | Pereira et al. | |
| 8,972,434 B2 | 3/2015 | English et al. | |
| 9,047,616 B2 * | 6/2015 | Schnabl ............ | G06Q 30/0202 |
| 9,069,864 B2 | 6/2015 | Liu | |
| 9,154,549 B2 | 10/2015 | Sundararaj | |
| 9,158,786 B1 | 10/2015 | Walsh et al. | |
| 9,172,809 B1 * | 10/2015 | Mockus .............. | H04M 3/5235 |
| 9,235,637 B1 | 1/2016 | Kamvar et al. | |
| 9,251,276 B1 * | 2/2016 | Langseth .......... | G06F 17/30893 |
| 9,357,020 B2 | 5/2016 | Ishida et al. | |
| 9,424,336 B2 | 8/2016 | Fuchs et al. | |
| 9,507,718 B2 | 11/2016 | Rash et al. | |
| 9,521,176 B2 | 12/2016 | Agnoli et al. | |
| 9,563,657 B2 | 2/2017 | Martins | |
| 2002/0078075 A1 * | 6/2002 | Colson ................ | H04L 67/1095 |
| 2002/0091994 A1 | 7/2002 | McCready et al. | |
| 2003/0158913 A1 | 8/2003 | Agnoli et al. | |
| 2003/0177338 A1 * | 9/2003 | Luick ................ | G06F 9/30083 712/209 |
| 2003/0182261 A1 | 9/2003 | Patterson | |
| 2003/0225644 A1 | 12/2003 | Casati et al. | |
| 2004/0193631 A1 | 9/2004 | Kumashio | |
| 2004/0221053 A1 * | 11/2004 | Codella .................. | H04L 47/10 709/231 |
| 2004/0249810 A1 | 12/2004 | Das et al. | |
| 2005/0015492 A1 | 1/2005 | Kumbalimutt et al. | |
| 2005/0165753 A1 | 7/2005 | Chen et al. | |
| 2005/0234890 A1 | 10/2005 | Enzler et al. | |
| 2006/0036600 A1 | 2/2006 | Chaudhuri et al. | |
| 2006/0047830 A1 | 3/2006 | Nair et al. | |
| 2006/0106759 A1 | 5/2006 | Nemoto et al. | |
| 2006/0155920 A1 | 7/2006 | Smith et al. | |
| 2006/0265288 A1 | 11/2006 | Aronson | |
| 2006/0277308 A1 * | 12/2006 | Morse ............... | G06F 17/30867 709/227 |
| 2006/0293872 A1 | 12/2006 | Zamora et al. | |
| 2007/0022256 A1 | 1/2007 | Cantin et al. | |
| 2007/0162425 A1 | 7/2007 | Betawadkar-Norwood | |
| 2007/0174188 A1 | 7/2007 | Fish | |
| 2007/0208607 A1 | 9/2007 | Amerasinghe et al. | |
| 2007/0226178 A1 | 9/2007 | Ewen et al. | |
| 2007/0288495 A1 | 12/2007 | Narasayya et al. | |
| 2008/0065588 A1 | 3/2008 | Aldrich | |
| 2008/0154827 A1 * | 6/2008 | Connors ................ | G06Q 40/04 706/46 |
| 2009/0013089 A1 | 1/2009 | Sullivan et al. | |
| 2009/0132906 A1 | 5/2009 | Aoki | |
| 2009/0144103 A1 | 6/2009 | Malov et al. | |
| 2009/0150343 A1 | 6/2009 | English et al. | |
| 2009/0177667 A1 | 7/2009 | Ramos et al. | |
| 2009/0177988 A1 | 7/2009 | Martins | |
| 2009/0241176 A1 | 9/2009 | Beletski et al. | |
| 2009/0254663 A1 | 10/2009 | Alperovitch et al. | |
| 2009/0259522 A1 | 10/2009 | Rapperport et al. | |
| 2009/0287814 A1 | 11/2009 | Robertson et al. | |
| 2009/0300544 A1 | 12/2009 | Psenka et al. | |
| 2009/0322755 A1 | 12/2009 | Holm-Peterson et al. | |
| 2009/0328054 A1 | 12/2009 | Paramasivam et al. | |
| 2010/0010984 A1 | 1/2010 | Matias | |
| 2010/0017740 A1 | 1/2010 | Gonzalez Veron | |
| 2010/0088258 A1 * | 4/2010 | Oaten ...................... | G06N 5/02 706/13 |
| 2010/0131654 A1 | 5/2010 | Malakapalli et al. | |
| 2010/0153429 A1 | 6/2010 | Xu et al. | |
| 2010/0162152 A1 | 6/2010 | Allyn et al. | |
| 2010/0185619 A1 | 7/2010 | Zhang et al. | |
| 2010/0205128 A1 | 8/2010 | Nolan et al. | |
| 2011/0055202 A1 | 3/2011 | Heimendinger | |
| 2011/0137896 A1 | 6/2011 | Masunaga et al. | |
| 2011/0202841 A1 | 8/2011 | Dempster et al. | |
| 2011/0246388 A1 | 10/2011 | Zhang | |
| 2011/0271071 A1 | 11/2011 | Nakatogawa | |
| 2011/0289185 A1 | 11/2011 | Heder et al. | |
| 2012/0023120 A1 | 1/2012 | Kanefsky | |
| 2012/0089920 A1 | 4/2012 | Eick | |
| 2012/0095958 A1 | 4/2012 | Pereira et al. | |
| 2012/0151399 A1 | 6/2012 | Soerensen et al. | |
| 2012/0173759 A1 | 7/2012 | Agarwal et al. | |
| 2012/0203762 A1 | 8/2012 | Kakarlamudi | |
| 2012/0210119 A1 | 8/2012 | Baxter et al. | |
| 2012/0254316 A1 | 10/2012 | Son et al. | |
| 2012/0271748 A1 | 10/2012 | DiSalvo | |
| 2012/0299965 A1 | 11/2012 | Agarwal et al. | |
| 2013/0066895 A1 | 3/2013 | Choi et al. | |
| 2013/0083031 A1 | 4/2013 | Lehnherr et al. | |
| 2013/0111467 A1 | 5/2013 | Sundararaj | |
| 2013/0173707 A1 | 7/2013 | Ishida et al. | |
| 2013/0208591 A1 | 8/2013 | Larsen et al. | |
| 2013/0268520 A1 | 10/2013 | Fisher et al. | |
| 2013/0297646 A1 | 11/2013 | Watari | |
| 2013/0304798 A1 * | 11/2013 | Chang ........................ | G06F 9/54 709/203 |
| 2014/0156343 A1 | 6/2014 | Olsen | |
| 2014/0207756 A1 | 7/2014 | Kaminsky et al. | |
| 2014/0301191 A1 | 10/2014 | Ludwig et al. | |
| 2014/0310470 A1 | 10/2014 | Rash et al. | |
| 2014/0358634 A1 | 12/2014 | Schnabl et al. | |
| 2014/0359471 A1 | 12/2014 | Roundtree et al. | |
| 2015/0006483 A1 | 1/2015 | Goetsch | |
| 2015/0006615 A1 | 1/2015 | Wainner et al. | |
| 2015/0046429 A1 | 2/2015 | Eblightian | |
| 2015/0046449 A1 | 2/2015 | Langseth et al. | |
| 2015/0046815 A1 | 2/2015 | Langseth et al. | |

(56) References Cited

U.S. PATENT DOCUMENTS

| | | |
|---|---|---|
| 2015/0088919 A1 | 3/2015 | Hunter et al. |
| 2015/0106431 A1 | 4/2015 | Kumbalimutt et al. |
| 2015/0161211 A1 | 6/2015 | Patel et al. |
| 2015/0178133 A1* | 6/2015 | Phelan .................. G06F 9/5016 718/103 |
| 2015/0254307 A1 | 9/2015 | Johnson et al. |
| 2015/0261773 A1 | 9/2015 | Walid et al. |
| 2015/0324356 A1 | 11/2015 | Andres Gutierrez et al. |
| 2015/0334091 A1 | 11/2015 | Tock et al. |
| 2015/0341407 A1 | 11/2015 | Agnoli et al. |
| 2016/0004744 A1 | 1/2016 | Eriksson |
| 2016/0063058 A1 | 3/2016 | Spehr et al. |
| 2016/0224641 A1 | 8/2016 | Elias et al. |
| 2016/0239765 A1 | 8/2016 | Pasero et al. |
| 2016/0246519 A1 | 8/2016 | McKean et al. |
| 2016/0321270 A1 | 11/2016 | Hansson et al. |

FOREIGN PATENT DOCUMENTS

| | | |
|---|---|---|
| WO | WO 2007/068279 A1 | 6/2007 |
| WO | WO 2014/011708 | 1/2014 |
| WO | WO 2016/021019 | 2/2016 |

OTHER PUBLICATIONS

Keim et al., "Information Visualization and Visual Data Mining", IEEE Transactions on Visualization and Computer Graphics, vol. 8, No. 1, Jan.-Mar. 2002, pp. 1-8.

Kandel et al., "Enterprise Data Analysis and Visualization: An Interview Study", IEEE Transactions on Visualization and Computer Graphics, vol. 18, No. 12, Dec. 2012, pp. 2017-2026 (10 pages).

Pham et al., "Visualization of Diversity in Large Multivariate Data Sets", IEEE Transactions on Visualization and Computer Graphics, vol. 16, No. 6, Nov./Dec. 2010, pp. 1053-1062 (10 pages).

Rubel et al., "Integrating Data Clustering and Visualization for the Analysis of 3D Gene Expression Data", IEEE/ACM Transactions on Computational Biology and Bioinformatics, vol. 7, No. 1, Jan.-Mar. 2010, pp. 64-79 (16 pages).

Yu et al., "Visual Mining of Multimedia Data for Social and Behavioral Studies", IEEE Symposium on Visual Analytics Science and Technology, Oct. 21-23, 2008, pp. 155-162 (8 pages).

Non-Final Office Action as issued in U.S. Appl. No. 15/188,975, dated Aug. 19, 2016.

Non-Final Office Action as issued in U.S. Appl. No. 15/190,153, dated Oct. 14, 2016.

Non-Final Office Action as issued in U.S. Appl. No. 15/197,733, dated Nov. 3, 2016.

Baron Schwartz, "Selecting Representative Samples From a Stream of Queries", Jul. 3, 2015 downloaded from URL<https://www.vividcortex.com/blog/2015/07/03/representative-samples-stream-queries/>, 6 pages.

Surajit Chaudhuri et al., "Optimized Stratified Sampling for Approximate Query Processing", ACM Transactions on Database Systems, vol. 32, No. 2, Article 9, Jun. 2007, downloaded from URL<http://ranger.uta.edu/~gdas/websitepages/preprints-papers/a9-chaudhuri.pdf>, 50 pages.

Daniel Gomes et al., "Webstore: a Manager for Incremental Storage of Contents", Nov. 2004, downloaded from URLhttp://repositorio.ul.pt/bitstream/10455/2910/1/04-15.pdf, 22 pages.

Hussam Abu-Libdeh et al., "RACS: A Case for Cloud Storage Diversity", SoCC'10, Jun. 10-11, 2010, downloaded from URL<http://pubs.0xff.ps/papers/racs-socc.pdf>, 11 pages.

Valeria Cardellini et al., "Dynamic Load Balancing on Web-server Systems", IEEE Internet Computing, vol. 3, No. 3, May-Jun. 1999, pp. 28-39.

P. Kuppusamy et al. "Cluster Based Cooperative Caching Approach Through Mobility Prophecy in MANET", Computing Communication & Networking Technologies (ICCCNT), Third International Conference on. IEEE, Jul. 26-28, 2012, 10 pages.

Final Office Action dated Apr. 27, 2017 in corresponding U.S. Appl. No. 15/190,153 (17 pages).

Non-Final Office Action dated Feb. 17, 2017 in corresponding U.S. Appl. No. 15/382,522 (24 pages).

Non-Final Office Action dated Feb. 17, 2017 in corresponding U.S. Appl. No. 15/382,249 (15 pages).

Non-Final Office Action dated Feb. 22, 2017 in corresponding U.S. Appl. No. 15/382,513 (25 pages).

Non-Final Office Action dated Feb. 28, 2017 in corresponding U.S. Appl. No. 15/382,510 (26 pages).

Non-Final Office Action dated Mar. 21, 2017 in corresponding U.S. Appl. No. 15/409,499 (34 pages).

Non-Final Office Action dated Mar. 24, 2017 in corresponding U.S. Appl. No. 15/382,534 (13 pages).

Notice of Allowance dated Mar. 31, 2017 in corresponding U.S. Appl. No. 15/197,733 (16 pages).

Non-Final Office Action dated Mar. 13, 2017 in corresponding U.S. Appl. No. 15/428,136 (19 pages).

Final Office Action dated Jul. 12, 2017 in corresponding U.S. Appl. No. 15/382,513 (27 pages).

Notice of Allowance dated Jul. 13, 2017 in corresponding U.S. Appl. No. 15/409,499 (9 pages).

Non-Final Office Action dated Jul. 14, 2017 in corresponding U.S. Appl. No. 15/382,534 (14 pages).

Final Office Action dated Aug. 21, 2017 in corresponding U.S. Appl. No. 15/382,522 (23 pages).

Final Office Action dated Sep. 1, 2017 in corresponding U.S. Appl. No. 15/382,510 (33 pages).

Final Office Action dated Sep. 7, 2017 in corresponding U.S. Appl. No. 15/382,249 (18 pages).

* cited by examiner

PRIORITIZATION OF RETRIEVAL AND/OR PROCESSING OF DATA

CROSS-REFERENCE TO RELATED APPLICATIONS

This present application is a continuation of U.S. patent application Ser. No. 14/634,680, entitled "PRIORITIZED RETRIEVAL AND/OR PROCESSING OF DATA," filed on Feb. 27, 2015, the content of which is hereby incorporated herein by reference in its entirety.

FIELD OF THE INVENTION

The invention relates generally to prioritizing retrieval and/or processing of data over retrieval and/or processing of other data.

BACKGROUND OF THE INVENTION

With the recent influx of smartphones, tablets, and/or other mobile devices having connectivity to the Internet, businesses, consumers, or other users are frequently receiving, analyzing, sharing, and creating new information. Obtaining such information may involve querying for data across a plurality of data sources. Because retrieval and/or processing of such data may be time consuming, and users are often not provided with their requested information until retrieval and processing of such data have finished, there may be considerable delay before a user is provided with any substantive information related to their request. These and other drawbacks exist.

SUMMARY OF THE INVENTION

The invention addressing these and other drawbacks relates to methods, apparatuses, and/or systems for prioritizing retrieval and/or processing of data over retrieval and/or processing of other data. In certain implementations, retrieval and/or processing of data related to one subset of attributes may be prioritized over retrieval and/or processing of data related to other subsets of the attributes to reduce latency related to providing a presentation of values associated with the attributes and/or to provide other benefits. As an example, the prioritization may be based on a prediction that one subset of the attributes (and its associated values) will be presented in a portion of a user interface that is initially "in-view" (e.g., seen by the user) and/or that the other subsets of the attributes (and their associated values) will be presented in a portion of a user interface that is initially "out-of-view" (e.g., not seen by the user). Based on the prioritization, for example, (1) data related to the prioritized attribute subset may be retrieved and/or processed before the retrieval and/or processing of data related to the other attribute subsets, (2) more computing resources may be allocated for retrieving and/or processing data related to the prioritized attribute subset than for retrieving and/or processing data related to the other attribute subsets, or (3) other prioritization techniques may be performed.

In some implementations, retrieval and/or processing of data related to a subset of attributes may be prioritized based on a prediction of values associated with the attributes. As an example, based on a request for values associated with a set of attributes, an initial query (or an initial set of "micro-queries") may be performed to obtain an initial subset of data related to calculating values associated with the attributes. The associated values may then be predicted based on the initial data subset, and the predicted values may be utilized to prioritize retrieval and/or processing of data related to one subset of the attributes over retrieval and/or processing of data related to other subsets of the attributes. In one use case, for example, priority may be assigned to a particular subset of attributes when the predicted values associated with the subset of the attributes are greater than the predicted values associated with other subsets of the attributes (e.g., if the attributes and their associated values are to be presented in descending order). In another use case, priority may be assigned to a particular subset of attributes when the predicted values associated with the subset of the attributes are less than the predicted values associated with other subset of the attributes (e.g., if the attributes and their associated values are to be presented in ascending order).

In some implementations, an "attribute" may comprise an object, an entity, a property, a characteristic, etc., of the entity-attribute-value model (which may also be referred to as the "object-attribute-value model") or other data model. As an example, with respect to the entity-attribute-value model, a value associated with two attributes may comprise a value associated with a characteristic of an entity where the characteristic is a first attribute and the entity is a second attribute.

These and other features of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

The invention is illustrated by way of example, and not by way of limitation, in the figures of the accompanying drawing and in which like reference numerals refer to similar elements.

DETAILED DESCRIPTION OF THE INVENTION

In the following description, for the purposes of explanation, numerous specific details are set forth in order to provide a thorough understanding of the implementations of the invention. It will be appreciated, however, by one skilled in the art that the implementations of the invention may be practiced without these specific details or with an equivalent arrangement. In other instances, well-known structures and devices are shown in block diagram form in order to avoid unnecessarily obscuring the implementations of the invention. It should be noted that features (e.g., components, operations, or other features) described herein may be implemented separately or in combination with one another.

Figure 1:
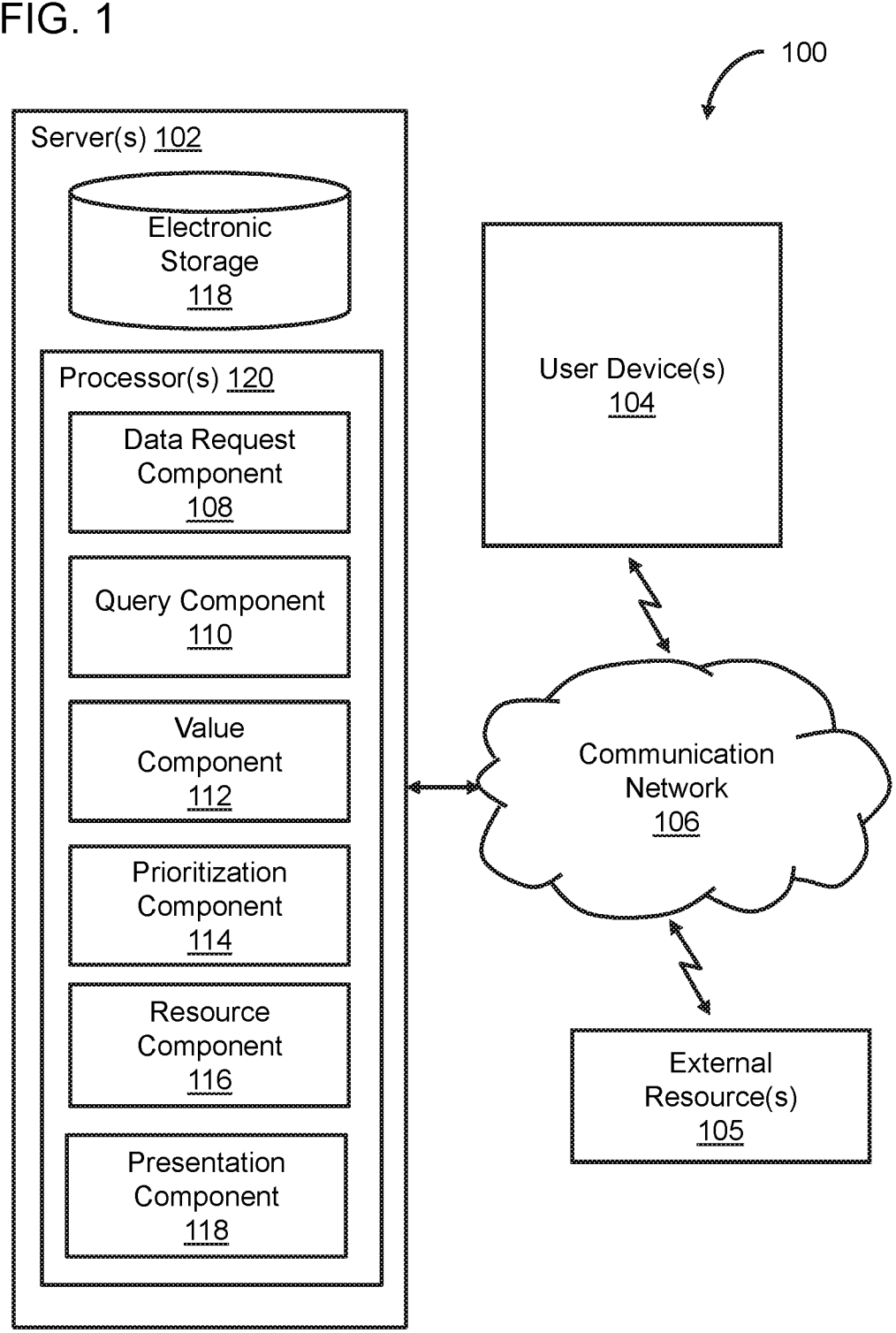
FIG. 1 illustrates a diagram of a system for prioritizing retrieval and/or processing of data related to a subset of attributes based on a prediction of associated values, in accordance with one or more implementations.

FIG. 1 illustrates a diagram of system 100 for prioritizing retrieval and/or processing of data related to a subset of attributes based on a prediction of associated values, in accordance with one or more implementations. System 100 may comprise one or more servers 102. Server 102 (or servers 102) may be configured to communicate with one or more user devices 104 according to a client/server architecture (e.g., over communication network 106 or via other communication medium). Users may access system 100 via user devices 104.

Server 102 may be programmed to execute one or more computer program components to facilitate prioritization of retrieval and/or processing of data. The computer program components may include a data request component 108, a query component 110, a value component 112, a prioritization component 114, a resource component 116, a presentation component 118, and/or other components.

The data request component 108 may be programmed to receive a request for values associated with respective attributes. A value may be associated with one or more attributes (e.g., an object, an entity, a property, a characteristic, etc.). As an example, with respect to FIG. 2, values represented by data elements 206a-206y may each be associated with at least one attribute represented in sections 202a-202e, at least one attribute represented in sections 204a-204e, and at least one attribute represented in sections 208a-208e.

Presentation component 118 may be programmed to effectuate presentation of a data visualization user interface (e.g., at user devices 104). The data visualization user interface may be programmed to receive entry and/or selection by users of a first attribute group (associated with first attributes), a second attribute group (associated with second attributes), and/or other information. The user entry and/or selection may correspond to a request for values. The data visualization user interface may be programmed to present (predicted, updated, and/or calculated) values associated with a set of attributes (or a representation thereof) based on the request.

In some implementations, a data visualization user interface provided by presentation component 118 may be in the form of a pivot table (or other display style). The data visualization user interface may include rows, columns, data elements, other portions, and/or other interface elements. The rows and columns may represent respective ones of at least a first set of attribute (or first attributes) and a second set of attributes (or second attributes). Data elements may individually represent a value associated with a respective one of the first attributes and a respective one of the second attributes. For example, a data visualization user interface may include a construction of an N by M matrix where N represents a series of first attributes in rows and M represents a series of second attributes as columns. The intersection of N and M may represent the data elements representing the values associated with the first and second attributes.

Figure 2:
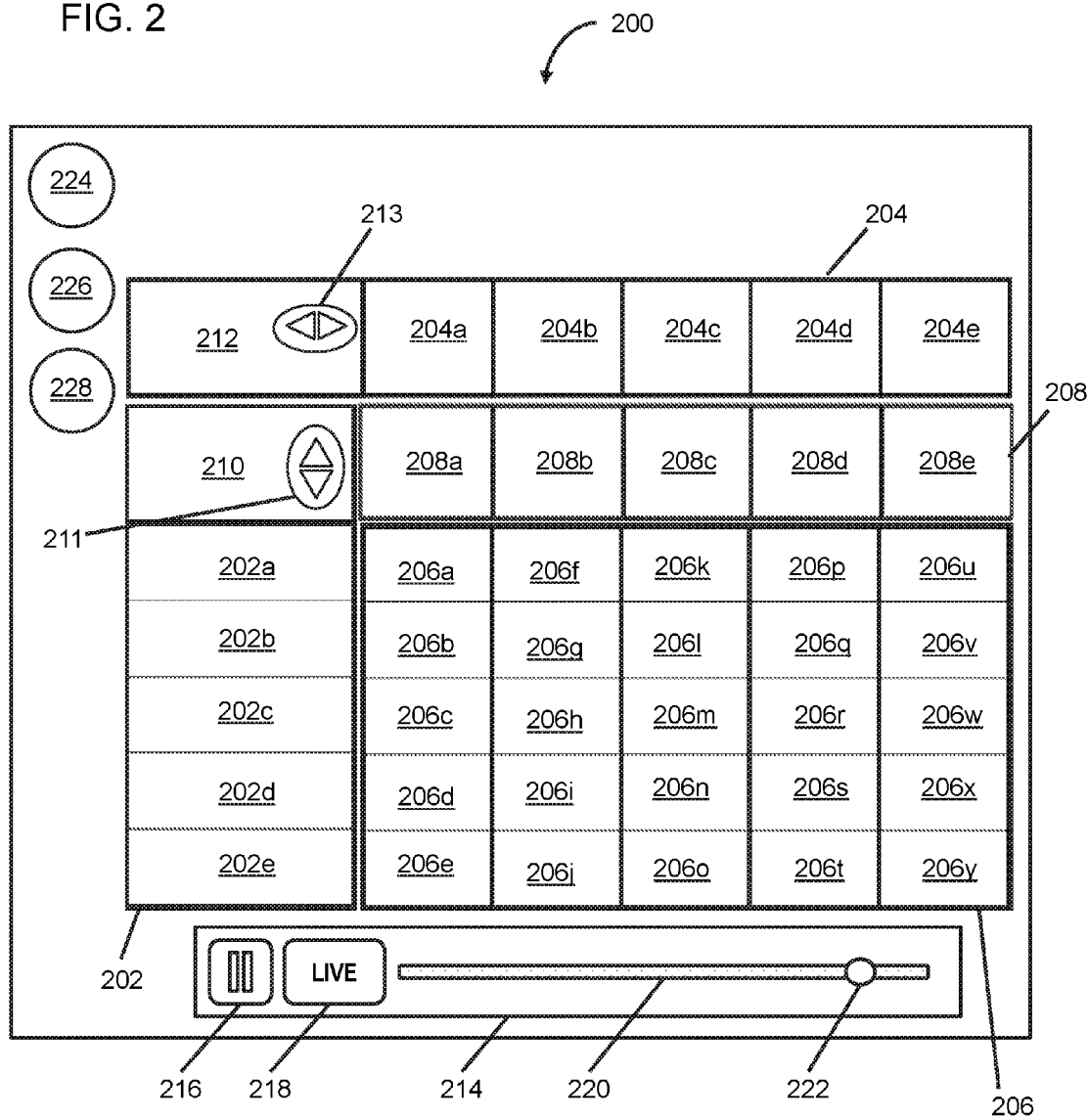
FIG. 2 illustrates a data visualization user interface, in accordance with one or more implementations.

For example, FIG. 2 illustrates a diagram of a data visualization user interface 200 that facilitates the generation of requests for values and displays results from prioritized retrieval and/or processing of data. It is noted that the depiction of the user interface 200 and accompanying descriptions are intended for illustrative purposes only. For example, in some implementations, the procedures and/or processes described in connection with the user interface 200 may instead be performed without the presentation of values to a user. Instead, for instance, predicted values may simply be stored in a database for later use, placed into a queue for further processing, etc.

With that being said, in FIG. 2, portion 210 may represent a first attribute group (e.g., State, Gender, Zip Code, City, Income, Product Category, or other attribute group). Portion 202 may include sections 202a-202e that may represent at least a subset of attributes (e.g., Alabama, Alaska, Arizona, and/or other state; Male, Female, or other characteristic; 92007, 92014, 92024, and/or other zip code; 0-$25 k, $25 k-$50 k, and/or other income or range; Electronics, Books, Jewelry, Accessories, Arts, Audio, Men's, Woman's, and/or other product category; and/or other attributes) included in the first attribute group. Portion 210 may include a first control element 211. The first control element 211 may facilitate setting of a sorting preference for the attributes included in the first attribute group (e.g., thereby affecting the order in which the attributes may be presented). Sorting may be based on a description (e.g. name, numerical range, and/or other description) of respective ones of the attributes of the first attribute group, the values associated with the attributes of the first attribute group, or other criteria. For example, the first control element 211 may be used to sort the attributes of the first attributes group in ascending order based on their respective values, descending order based on their respective values, alphabetically based on the names of the first attributes, etc. As an example, the sorting may modify the subset of attributes that are displayed in sections 202a-202e.

In FIG. 2, portion 212 may represent a second attribute group (e.g., State, Gender, Zip Code, City, Income, Product Category, and/or other attribute group). Portion 204 may include sections 204a-204e that may represent a subset of attributes (e.g., Alabama, Alaska, Arizona, and/or other state . . . ; Male or Female; 92007, 92014, 92024, and/or other zip code; $0-$25 k, $25 k-$50 k, and/or other income or range; Electronics, Books, Jewelry, Accessories, Arts, Audio, Men's, Woman's, and/or other product category; and/or other attributes) included in the second attribute group. Portion 212 may include a second control element 213. The second control element 213 may facilitate setting a sorting preference for the attributes included in the second attribute group. The sorting may, for example, affect the attributes of the second attribute group that may be included in the subset of attributes displayed in sections 204a-204e.

Portion 206 may include data elements 206a-206y that may represent at least some values associated with the attributes of the first and/or second attribute groups. The values conveyed by the data elements 206a-206y may be associated with respective ones of the attributes of the first attribute group in sections 202a-202e and respective ones of the attributes of the second attribute group in sections 202a-202e. For example, data element 206a may be associated with a first attribute in section 202a and a second attribute in section 204a.

Control elements 224, 226, and/or 228 may facilitate user modifications to the data visualization user interface 200. As an example, control element 224 may correspond to configuring and/or setting the attribute groups represented by the Columns and Rows of the pivot table (e.g., FIG. 3). Control element 226 may be selected to apply filters to explore other available data elements 206a-206y that may not currently be in the viewable area of portion 206 or may initiate requests for other values. Control element 228 may be selected to change the display style for depicting the attribute groups, attributes, values, and/or other information. Display styles may comprise a pivot table, a bar chart, a bubble graph, a pie chart, a scatter plot, a word cloud, a zoomable map, and/or other display style.

Still referring to FIG. 2, portion 214 may include a pause/play button 216 for pausing or playing the data visualization, an indicator 218 specifying that the data visualization is live data, and a sliding-based control element 220 having a movable control element 222 for rewinding to visualize historical data, fast-forwarding back to visualizing live data, fast-forwarding to visualize predictions of future data, etc. As shown by indicator 218, the data visualization that is depicted in portion 206 may represent live data. A user may, for example, slide movable control element 222 to the left on sliding-based control element 220 to switch the data visualization of the live data to a data visualization of historical data.

In one use case, with respect to FIG. 2, data elements 206a-206y may represent values associated with attributes displayed in sections 202a-202e (and/or with value types displayed in section 208a-208e). The associated values may, for example, include the most up-to-date values for a certain time period thus far (e.g., a current day, week, month, year, etc.). Upon moving of movable control element 222 toward the left along sliding-based control element 220 onto a point associated with a particular time, a request for data elements associated with the displayed attribute (with respect to the particular time and/or time period) may be initiated. As an example, responsive to the request, a historical data store may be determined and used to obtain data necessary for determining values that may be represented by the data elements 206a-206y.

Returning to FIG. 1, based on the selection of a first and/or a second attribute group, the query component 110 may be programmed to perform queries for data relating to attributes of the first attribute group, attributes of the second attribute group, and/or other attributes. The queries may be performed across a plurality of data sources. The queries may be performed over one or more query intervals (e.g., based on data sources, time periods, geographic areas, etc.). As an example, responsive to a user request for a data visualization of overall sales volume of various product categories during a particular year, at least first and second sets of queries may be performed (where each set comprises one or more queries). The first and second sets of queries may be performed in series or in parallel. When data from one set of queries is obtained, the obtained data may be processed to predict the values associated with the overall sales volume of the various product categories during the requested year without having to wait for data from the other set(s) of queries to be obtained. When data from at least one remaining set of queries is obtained, this data may then be processed to updated the predicted values (e.g., if not all of the queries has returned data) and/or calculate the final values associated with the overall sales volume of the various product categories during the requested year (e.g., if data from all of the queries has been obtained).

In one use case, the first set of queries may comprise one or more queries to a first subset of the relevant data sources to be searched for the requested data, and the second set of queries may comprise one or more queries to a second subset of the relevant data sources for the requested data. In another use case, the first set of queries may comprise one or more queries for such data related to one or more time periods during the requested year, and the second set of queries may comprise one or more queries for such data related to one or more other time periods during the requested year. The time periods for each set of queries may, for example, comprise randomly-selected time periods during the requested year (e.g., randomly-selected amount of time per period, randomly-selected time periods with predefined amount of time per period), a predefined set of time periods during the requested year, or other time periods which together comprise a subset of the requested year.

In another yet use case, the first set of queries may comprise one or more queries for such data related to one or more geographic areas (e.g., a subset of zip codes per state, a subset of cities per state, a subset of regions per country, etc.), and the second set of queries may comprise one or more queries for such data related to one or more other geographical areas. The geographical areas for each set of queries may, for example, comprise randomly-selected geographical areas, a predefined set of geographical areas, or other geographical areas which together comprise a subset of an overall requested geographical area.

In one implementation, the value component 112 may be programmed to predict values associated with a set of attributes based on a subset of data obtained via an initial query that corresponds to an initial query interval (e.g., a subset of relevant data sources, a subset of a requested time period, a subset of a requested geographic area, etc.). In some implementations, the quantity of available and/or possible attributes included in a first attribute group may be unknown and/or may be large (e.g., hundreds, thousands, tens of thousands, and/or other amount). Due to these or other factors, performing queries for data related to all possible and/or available attributes of the first attribute group may cause unnecessarily delay in getting an adequate representation of the data to a user. The prioritization component 114 may be programmed to determine a first subset of attributes (e.g., that should be prioritized) of the first attribute group based on the prediction of the values, priority criteria, and/or other information. The first subset of attributes may include respective ones of the first attributes associated with predicted values most relevant to the priority criteria. The priority criteria may relate to a threshold quantity of attributes (e.g., 10, 100, 200, and/or other considerations) for the first subset, sorting preference of the attributes (e.g., sorted from highest value to lowest value), or other criteria. As an example, the first subset of the attributes (that is to be given priority over other subsets of the attributes) may include up to the threshold quantity of attributes with predicted values that are higher than predicted values associated with other attribute subsets.

By way of illustration referring back to FIG. 2, once a first attribute group (or other attribute group), priority criteria, and/or other information has been determined (e.g., set by a user), an initial query may be performed to obtain a subset of data related to calculating values associated with attributes of the first attribute group. A prediction of the values may be calculated based on the subset of data obtained via the initial query. The predicted values may be reflected in the display of data elements 206a-206y. Based on the predicted values, priority criteria, and/or other information, the attributes of the first attribute group to be included in sections 202a-202e may be selected.

In the current depiction, the data visualization user interface 200 may be limited to displaying only five attributes of the first attribute group at a given time. As such, the priority criteria may specify that the number of attributes to be included in the subset of attributes displayed in sections 202a-202e to be equal to five. However, this amount is provided for illustrative purposes only and is not to be considered limiting. In other implementations, this amount may vary depending on the size of the data visualization user interface 200, user input, the available quantity of the attributes of the first attribute group, and/or other criteria. In this manner, the user (or other entity having interest in the values) may be provided an initial presentation of the selected subset of the attributes and their predicted values.

In one scenario, with respect to FIG. 2, a first attribute group "Product Category" may include attributes such as Books, Electronics, Jewelry, Men, Women, Toys, Pet products, and/or other attributes. A second attribute group "User Income" may include attributes such as $0 to $25,000, $25,000 to $50,000, $50,000 or more, and/or other attributes. A third attribute group "Sale Numbers" may include sales volume and/or other attributes. As an example, Table 1 below may represent predicted values associated with sale volumes (e.g., by unit), respective ones of the "Product Category" attributes (e.g., rows), and respective ones of the "User Income" attributes (e.g., columns) that may be streamed in real-time.

TABLE 1

| Product Category | User Income | | |
|---|---|---|---|
| | $0 to $25,000 Volume | $25,000-$50,000 Volume | $50,000 or more Volume |
| Books | 107,460,342 | 107,476,521 | 71,653,491 |
| Electronics | 80,622,191 | 80,610,360 | 53,752,435 |
| Jewelry | 67,181,209 | 67,180,592 | 44,799,309 |
| Men | 26,858,564 | 26,871,587 | 17,906,847 |
| Women | 26,874,505 | 26,877,982 | 17,917,377 |

The values in Table 1 may be predicted sales volumes of the respective "Product Category" and "User Income" attributes for a certain time period (e.g., current day, week, month, year, etc.). The predicted values may represent a first prediction based on a first subset of data received from a first query. For example, the above values may represent a prediction of sales volumes for a 1 hour period of a given day and/or other time period. From the first prediction, it may be determined that Books, Electronics, Jewelry, Men, and Women product categories occupy the top five highest sales volumes with regard to all product categories. For example, in Table 1, the highest predicted sales volume on a product category basis for users in the income range of $0 to $25,000 is Books at 107,460,342 units. Such values may be reflected by data elements 206a-206y in the pivot table of the data visualization user interface 200. The values may be updated continuously to represent the most up-to-date prediction of sales volume values for each of the attributes as more queries for data are performed.

Returning to FIG. 1, the prioritization component 114 may be programmed to prioritize, based on a prediction of values associated with a set of attributes, retrieval and/or processing of data related to one subset of the attributes over retrieval and/or processing of data related to one or more other subsets of the attributes. Prioritizing retrieval and/or processing may be based on a comparison of the predicted values with one another (e.g., based on highest to lowest sorting, lowest to highest sorting, and/or other considerations). In FIG. 2, the retrieval and/or processing of data related to the attributes in sections 202a-202e may be prioritized over attributes not included in the sections 202a-202e (e.g., the "Product Category" attributes not within the "top five" list). In the scenario of Table 1, the retrieval and/or processing of data related to Books, Electronics, Jewelry, Men, and Women may be prioritized over retrieval and/or processing of data related to Toys, Pet products, and/or other "Product Category" attributes.

Returning to FIG. 1, in some implementations, the resource component 116 may be programmed to allocate, based on the prioritization of retrieval and/or processing of data related to a subset of attributes, a greater amount of resources (e.g., processing power, random access memory space, non-volatile storage space, network resources, or other resources) to retrieval and/or processing of data related to the prioritized subset of the attributes than an amount of resources allocated to retrieval and/or processing of data related to the one or more other subsets of the first attributes. As a result of such allocation, for example, the amount of resources allocated to the prioritized subset of attributes (for retrieval and/or processing of its related data) may remain greater than the amount of resources allocated to the other subsets of attributes until the retrieval and/or processing of data related to the prioritized subset of attributes is completed.

In some implementations, the query component 110 may be programmed to perform, based on the prioritization of a subset of attributes, additional queries for data related to the prioritized subset of attributes. The additional queries may be performed before performing further queries for data related to other subsets of attributes. The query component 110 may be programmed to receive, based on the additional queries, additional data related to calculating the values of the prioritized subset of attributes. The value component 112 may be programmed to update, based on the additional data, the prediction of the values associated with the prioritized subset of attributes. As an example, with respect to FIG. 2, the update of the prediction of the values may be conveyed to a user by updating the data elements 206a-206y that represent the values. In the scenario shown in Table 1, the additional queries may be for data related to Books, Electronics, Jewelry, Men, and Women's apparel. An example of an updated prediction of the values for Books, Electronics, Jewelry, Men, and Women is shown in Table 2 below (as compared with Table 1 above).

TABLE 2

| Product Category | User Income | | |
|---|---|---|---|
| | $0 to $25,000 Volume | $25,000-$50,000 Volume | $50,000 or more Volume |
| Books | 106,554,102 | 107,481,412 | 72,112,474 |
| Electronics | 80,630,007 | 79,985,547 | 53,741,345 |
| Jewelry | 68,045,998 | 67,223,879 | 45,000,199 |
| Men | 26,910,094 | 27,747,203 | 18,023,814 |
| Women | 25,887,789 | 26,702,986 | 17,830,223 |

In some implementations, the query component 110 may be programmed to perform one or more other queries for data related to subsets of attributes other than a prioritized subset. The query component 110 may be programmed to receive, based on the other queries, one or more other subsets of data related to calculating the values associated with the other attributes. The value component 112 may be programmed to predict (e.g., a subsequent prediction) the values associated with the other attributes based on the other subsets of data.

In some implementation, the subset of attributes for which priority is given may be modified to add other attributes and/or to remove attributes from the prioritized subset. As an example, prioritization component 114 may be programmed to compare the updated predicted values associated with a current prioritized subset of the attributes with the predicted values associated with other subsets of the attributes. The prioritization component 114 may be programmed to update, based on the comparison, respective ones of the attributes that are included in the prioritized subset of the attributes. That is, by comparing the updated predicted values to one another, it may be determined whether one or more attributes should added to and/or removed from the prioritized subset of the attributes. As an example, the prioritized subset of the attributes may be updated to add one or more attributes to the prioritized subset if the updated predicted values of those attributes satisfy the priority criteria, and thus, should be included in the prioritized subset. As another example, the prioritized subset of the attributes may be updated to remove one or more attributes from the prioritized subset if the updated predicted values of those attributes no longer satisfy the priority criteria.

As an illustrative example, following the scenarios of Tables 1 and 2, Table 3 shown below depicts predicted values for other "Product Category" attributes (e.g., Toys and Pet Products) based on one or more other queries.

TABLE 3

| Product Category | User Income | | |
| --- | --- | --- | --- |
| | $0 to $25,000 Volume | $25,000-$50,000 Volume | $50,000 or more Volume |
| Toys | 85,142,348 | 83,174,635 | 55,636,759 |
| Pet products | 12,111,619 | 14,221,465 | 13,159,001 |

A comparison of values in Table 3 with those in Table 2 may show that attribute "Toys" (Table 3) may be associated with predicted values that may hierarchically fall between the updated predicted values of "Electronics" and "Books" (e.g., Table 2). As such, the subset of attributes in Table 2 may be updated to include the attribute "Toys," to be positioned between the attributes "Books" and "Electronics," as shown in Table 4 below. As depicted in Table 4 below, the attribute "Women" may be removed from the prioritized subset of attributes since it no longer fits within the "top five" criteria.

TABLE 4

| Product Category | User Income | | |
| --- | --- | --- | --- |
| | $0 to $25,000 Volume | $25,000-$50,000 Volume | $50,000 or more Volume |
| Books | 106,554,102 | 107,481,412 | 72,112,474 |
| Toys | 85,142,348 | 83,174,635 | 55,636,759 |
| Electronics | 80,630,007 | 79,985,547 | 53,741,345 |

TABLE 4-continued

| Product Category | User Income | | |
| --- | --- | --- | --- |
| | $0 to $25,000 Volume | $25,000-$50,000 Volume | $50,000 or more Volume |
| Jewelry | 68,045,998 | 67,223,879 | 45,000,199 |
| Men's apparel | 26,910,094 | 27,747,203 | 18,023,814 |

The above description is for illustrative purposes only and is not to be considered limiting with respect to the prediction of values, updating of a prioritized subset of attributes, and/or priority criteria. For example, in other implementations, priority criteria may specify other sorting preferences where attributes may be sorted by their respective values from lowest to highest, alphabetically, and/or other criteria.

Returning to FIG. 1, the value component 112 may be programmed to calculate, based on the prioritization, the final values of the values associated with the (current) prioritized subset of the attributes before calculating the final values associated with other subsets of the attributes. In some implementations, one or more other attributes not included in the prioritized subset of the attributes may be made available to the user via the data visualization user interface. For example, a first page may display the first subset of attributes, and a user may scroll between different pages in order to access and/or otherwise view the other attributes not included in the prioritized subset.

The above descriptions illustrate the an implementation involving a single attribute group defining rows and/or a single attribute group defining columns of a pivot table. However, in other implementations, users may request values associated with more than one attribute group for the rows and/or more than one attribute group for the columns.

Figure 3:
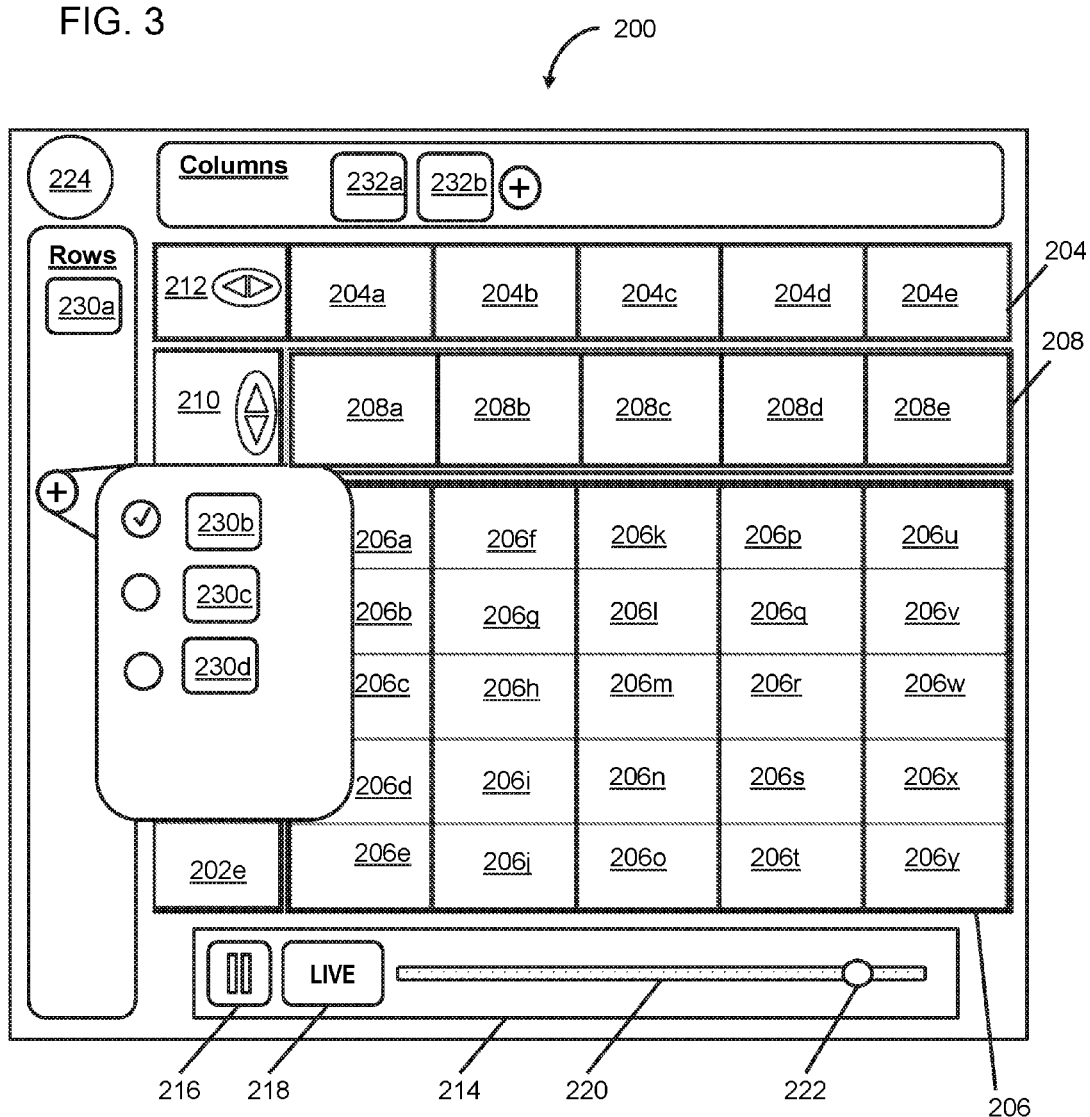
FIG. 3 illustrates a data visualization user interface, in accordance with one or more implementations.

As an illustrative example in FIG. 3, control element 224 may allow a user to add or remove attribute groups that define the rows and/or columns of the pivot table and the subsequent retrieval of data. Responsive to selection of control element 224, the user may be provided an additional user interface portions (e.g., pop up window or the like) which may facilitate configuring the Rows and Columns. In the Rows window, element 230a may represent the currently selected first attribute group for portion 210 (e.g., one of State, Gender, Zip Code, City, Income, Group, and/or other attribute group). The data visualization user interface 200 may be programmed such that a user may change the current selection of the first attribute group (e.g., deselect element 230a), add additional attribute groups to define the Rows of the pivot table through selection of the "+" element (e.g., facilitating selection of elements 230b, 230c, 230d, and/or other elements), and/or to perform more or less operations. By way of illustration, element 230b is shown selected such that the pivot table in data visualization user interface 200 (in FIG. 4) may have Rows corresponding to the first attribute group defined by element 230a and a fourth attribute group defined by element 230b.

Similarly, in the Columns window, elements 232a and 232b may represent the currently selected second attribute group for portion 212 (e.g., one of State, Gender, Zip Code, City, Income, Group, and/or other attribute group) and the currently selected third attribute group represented in portion 208. The data visualization user interface 200 may be programmed such that a user may change the current selection of the attribute groups (e.g., deselect elements 232a and/or 232b), add additional attribute groups to define the Columns of the pivot table, and/or to perform more or less operations. For example, a similar pop-up window as that showing elements 230b-d may be provided when a user selects the "+" element for the Columns portion to show the other available attribute groups that may be selected to define the Columns.

Figure 4:
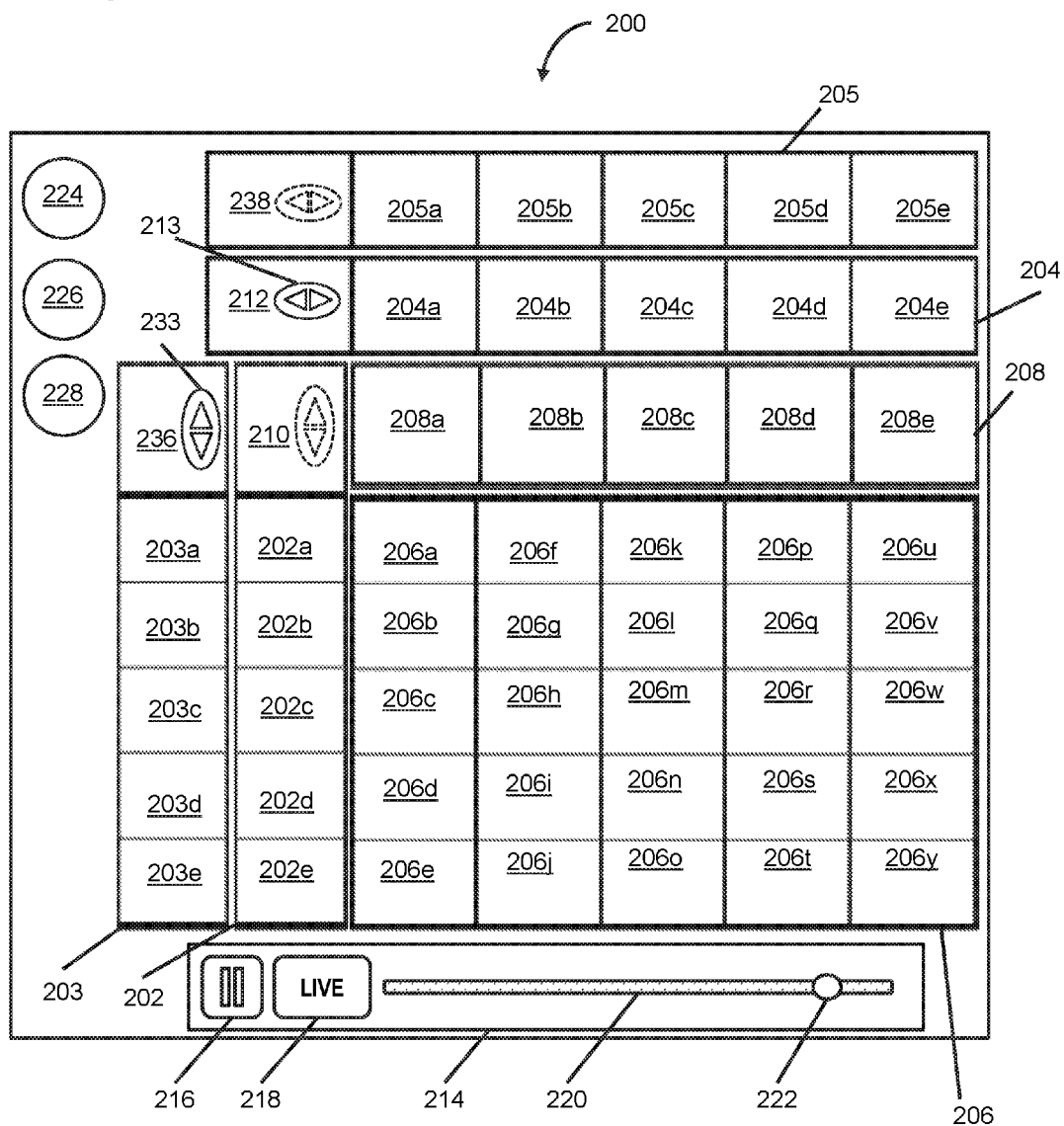
FIG. 4 illustrates a data visualization user interface, in accordance with one or more implementations.

FIG. 4 illustrates an implementation of data visualization user interface 200 wherein the rows of the table are defined by the first attribute group represented by portion 210 and a fourth attribute group represented by portion 236. The data visualization user interface 200 is additionally shown programmed such that columns of the table may be defined by the second attribute group represented by portion 212, the third attribute group represented by portion 208, and a fifth attribute group represented by portion 238. Portion 203 may include sections 203a-203f that may represent a subset of attributes included in the fourth attribute group. Portion 205 may include sections 205a-205e that may represent a subset of attributes included in the fifth attribute group.

It is noted that the current depiction of data visualization user interface 200 is provided merely for illustrative purposes and is not to be considered limiting with respect to the amount of attribute groups selected to define the rows and/or columns. For example, in other implementations, the rows may be defined by more than one attribute groups while the columns may be defined by one attribute group, etc. However, it is noted that the manner in which queries for data are performed, subsets of data are retrieved, and/or values associated with at least one of attributes may be similar to implementation shown and described with respect to FIG. 2. For example, given the selections of attributes groups shown in FIG. 4 in accordance with an implementation, a request for values associated with respective ones of the attributes of the various attribute groups may be received. A subset of data related to the attributes may be received based on an initial query (or queries) for such data. Values associated with respective ones of the attributes (e.g., a value associated with at least an attribute of the first attribute group and with an attribute of the fourth attribute group, and/or other values) may be predicted based on the initial subset of data. Based on the prediction of the values, retrieval and/or processing of data related to at least one subset of the attributes may be prioritized over retrieval and/or processing of data related to one or more other subset of the attributes. The manner in which the respective subsets of the attributes may be determined, the values may be predicted and/or updated, and/or other operations related to prioritized retrieval and/or processing of data as described herein may follow the same or similar processes described above. As an example, in one implementation with respect to FIG. 4, the data that may be retrieved may be related to all depicted attribute groups.

Table 5 below depicts an example of data retrieval result in accordance with the implementation of the data visualization user interface 200 shown in FIG. 4.

TABLE 5

| Product Sub-Category | Product Category | User Gender | | | | |
| --- | --- | --- | --- | --- | --- | --- |
| | | Male | Female | Male | Female | Female |
| | | | | User Income | | |
| | | $0-$25,000 Volume | $0-$25,000 Volume | $25,000-$50,000 Volume ↓ | $25,000-$50,000 Volume | $50,000 or more Volume |
| Watches | Jewelry | 33,012,040 | 34,662,170 | 116,381,612 | 34,836,617 | 44,214,836 |
| Accessories | Electronic | 20,279,672 | 37,480,551 | 103,016,203 | 46,337,399 | 55,790,438 |
| Bracelets | Jewelry | 74,045,124 | 32,662,423 | 75,316,569 | 97,711,350 | 71,867,982 |
| Women's | Books | 47,526,656 | 44,672,173 | 72,635,786 | 71,242,063 | 70,516,363 |
| Audio | Electronics | 83,296,596 | 25,383,349 | 65,450,089 | 55,185,292 | 26,676,082 |

In one scenario, a fourth attribute group "Product Sub-Category" may be added to the rows along with the first attribute group "Product Category." The fourth attribute group may include attributes such as Accessories, Arts, Audio, Bracelets, Men's, Woman's, and/or other attributes. A fifth attribute group "User Gender" may be added to the columns along with the second attribute group "User Income." The fifth attribute group may include attributes such as Male or Female. Their associated values may comprise predicted and/or calculated values representing sales volumes with respect to product category, product subcategory, user income, and user gender for a certain time period (e.g., day, week, month, year, etc.). The values shown in Table 5 may represent an initial prediction based on a subset of data received from an initial query. The "Product Category" attributes depicted in Table 5 may represent a prioritized subset of attributes, while the depicted "Product Sub-Category" attributes may represent a prioritized subset of third attributes. It is noted that Table 5 is sorted from highest to lowest sales volume value associated with at least the "Product Sub-Category" attribute and, in particular, with respect to Male's with an income range between $25,000 and $50,000. However in other implementations, the sorting may be changed based on user input. Based on a prediction of the values, it may be determined that the product sub-category "Watches" within the product category "Jewelry" occupies the highest sales volume at 116,381,612 units with respect to males having a salary range between $25,000 and $50,000. Such values may be reflected by data elements 206a-206y of the data visualization user interface 200 in FIG. 4. The values may be updated continuously to represent the most up-to-date overall sales volume values associated with the respective attributes as more queries for data are performed and/or as the most update-to-date subsets of attributes are determined.

Figure 5:
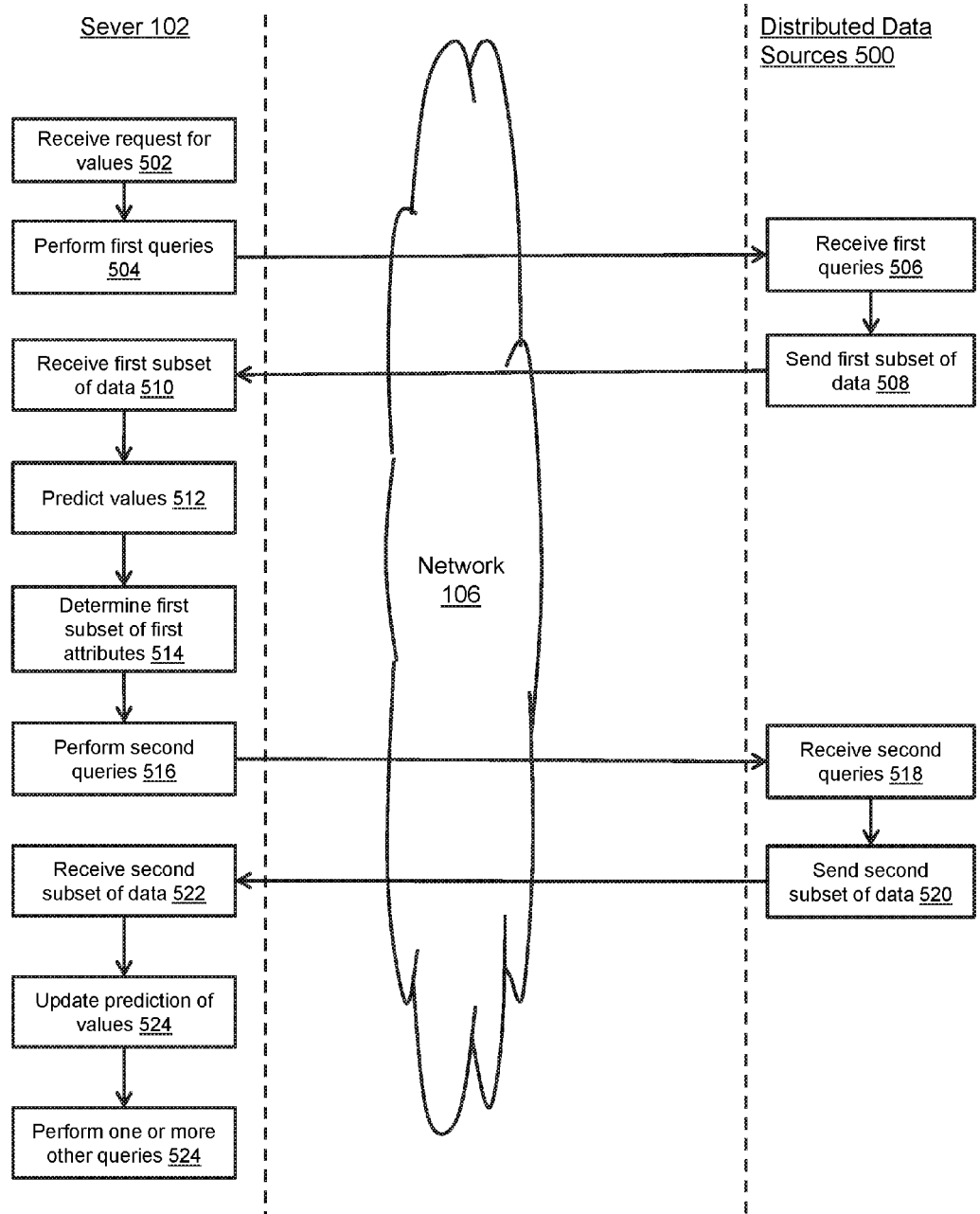
FIG. 5 illustrates an information exchange flowchart for prioritized retrieval and/or processing of data, in accordance with one or more implementations.
Figure 6:
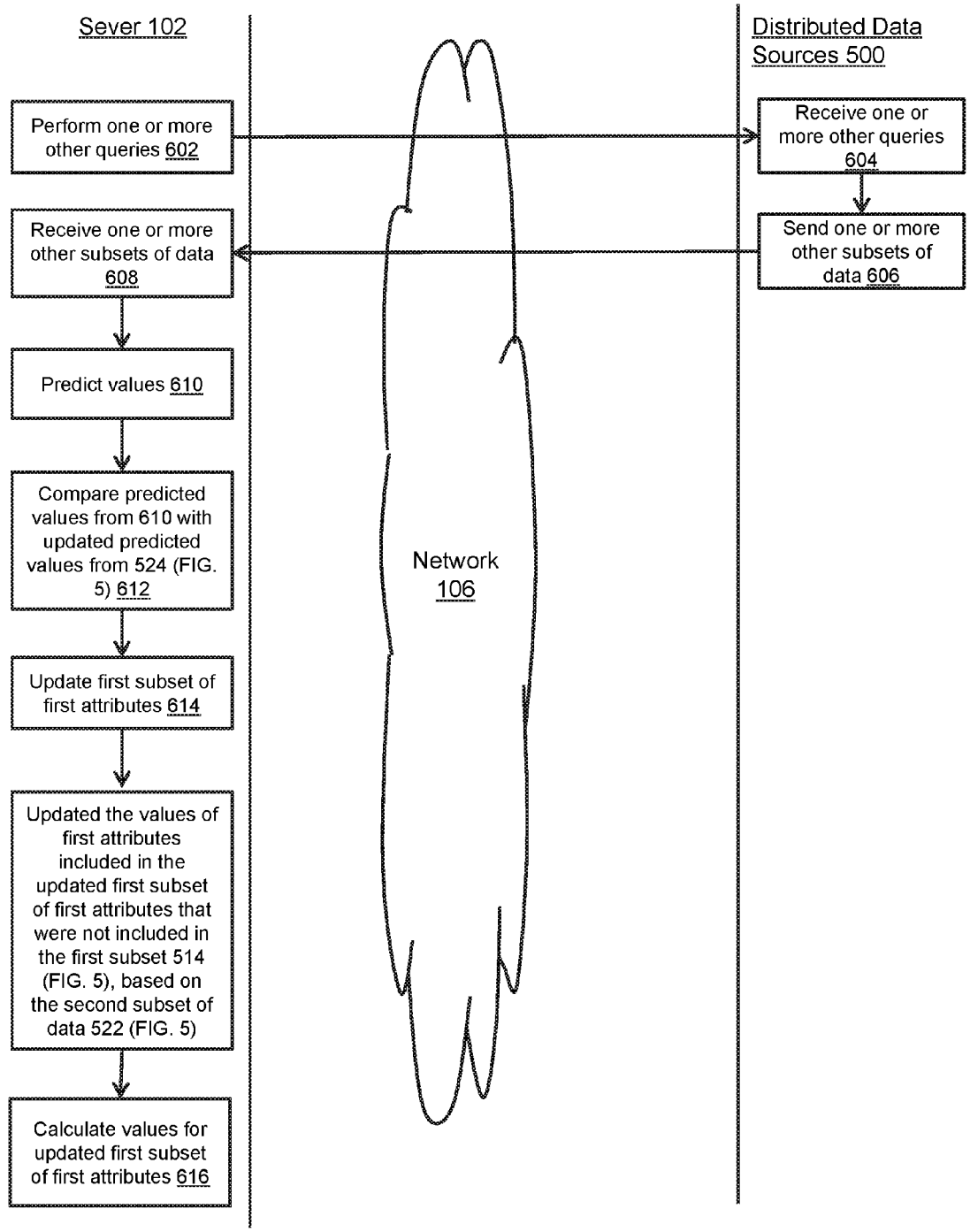
FIG. 6 illustrates an information exchange flowchart for prioritized retrieval and/or processing of data, in accordance with one or more implementations.

FIGS. 5 and 6 illustrate information exchange flow charts for prioritized retrieval and/or processing of data, in accordance with one or more implementations. The information may be exchanged between a server 102 (e.g., such as server 102 in FIG. 1) and one or more data sources (e.g., distributed data sources 500) over a network 106, such as the Internet.

In FIG. 5, a request for values associated with respective first attributes may be received 502 at server 102. First queries may be performed 504 at server 102. The first queries may be received 506 at appropriate data source(s) included in the distributed data sources 500. A first subset of data based on the first queries may be sent 508 from the data sources and received 510 at the server 102. The server 102 may include computer program components to predict 512 at least some of the values of respective ones of the first attributes based on the received first subset of data. A first subset of first attributes may be determined 514 based on the predicted values. Second queries for data related to the first subset of first attributes may be performed 516 by the sever 102. The second queries may be received 518 at appropriate ones of the distributed data sources 500. A second subset of data may be sent 520 from the data sources and received 522 at the server 102. Based on the second subset of data, the prediction of the values associated with the first subset of first attributes may be updated 524. One or more other queries for data may be performed 524.

In FIG. 6, one or more other queries for data related to one or more other first attributes may be performed 602 at server 102. The one or more other queries may be received 604 at appropriate ones of the data sources 500. The data sources may send 606 one or more other subsets of data based on the one or more other queries to server 102. The one or more other subsets of data may be received 608 at server 102 and used to predict 610 values of the one or more other first attributes. The predicted values of the one or more other first attributes may be compared 612 to the updated predicted values from step 524 shown in FIG. 5. The first subset of first attributes may be updated 614 based on the comparison. If the updated first subset of first attributes includes the other first attributes, the predicted values for the other first attributes may be updated based on data included in the second subset of data received at step 522 in FIG. 5.

In accordance with one or more implementations presented herein, the server 102 may be programmed to perform numerous micro-queries on the distributed data sources 500. As an example, server 102 (e.g., query component) may perform a plurality of micro-queries on distributed data sources 500 (e.g., comprising numerous data nodes at which data is stored) to update a current data visualization (e.g., updating a current data element set), generate a new data visualization (e.g., generating a new data element set), or facilitate other automated or user-requested operations. In response to the micro-queries, the query component may begin receiving streams of data from multiple ones of the data nodes. In response to the query component receiving results from a subset of the micro-queries, the value component may approximate or otherwise predict the final data values to generate data elements representing the final data values based on the subset of results. When the results from all of the micro-queries have been received, the actual final data values may be calculated, and the actual final data values may be utilized to generate data elements to replace the approximated data elements.

By way of example, micro-query delegation may be performed to enable faster real-time results of large streaming data by performing numerous micro-queries on a distributed data store. An approximation of the final data values may be performed based on results from a subset of the micro-queries that are completed by extrapolating from the resulting data that has been processed thus far to estimate the final data values before all of the micro-queries are completed. Data elements may be generated based on the approximated data values to present users with approximated visualized information without having to wait for all of the micro-queries to be completed. Upon completion of all the micro-queries or a determination that no further results is to be received in response to any further micro-queries, the final data values may be calculated and then utilized to generate data elements based on the final data values to replace the approximated data elements, thereby "sharpening" the data elements. In this way, among other benefits, user experience may be improved by providing users with visualized information representing final data values without having to wait for all of the results from the micro-queries to be received by predicting what the final data values will likely be based on results from a subset of the micro-queries that have been received.

In some scenarios, different types of data may be joined based on any number or criteria (e.g., time, geography, or other criteria), and visualization of the joined data may be presented using any number of approaches.

Returning to FIG. 1, user device 104 may comprise any type of mobile terminal, fixed terminal, and/or other device. For example, user device 104 may comprise a desktop computer, a notebook computer, a netbook computer, a tablet computer, a smartphone, a navigation device, an electronic book device, a gaming device, and/or any other user device. In some implementations, user device 104 may comprise the accessories and peripherals of these devices. User device 104 may also support any type of interface to the user (such as "wearable" circuitry, etc.).

Communication network 106 of system 100 may comprise one or more networks such as a data network, a wireless network, a telephony network, and/or other communication networks. A data network may comprise any local area network (LAN), metropolitan area network (MAN), wide area network (WAN), a public data network (e.g., the Internet), short range wireless network, and/or any other suitable packet-switched network. The wireless network may, for example, comprise a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium (e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth, Internet Protocol (IP) data casting, satellite, mobile ad-hoc network (MANET), etc.).

The external resource(s) 105 may include sources of information that are outside of system 100, external entities participating with system 100 (e.g., distributed data sources, and/or other considerations), and/or other resources. In some implementations, some or all of the functionality attributed herein to external resources 105 may be provided by resources included in system 100.

In some implementations, server 102 may include an electronic storage 118, one or more processors 120, and/or other components. Server 102 may include communication lines, or ports to enable the exchange of information with network 106 and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 118 may comprise non-transitory storage media that electronically stores information. The electronic storage media of electronic storage 118 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 118 may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor 120, information received from server 102, information received from user devices 104, and/or other information that enables server 102 to function as described herein. In some implementations, electronic storage may comprise a non-transitory, tangible computer-readable storage medium with an executable program stored thereon, wherein the program instructs a microprocessor to perform some or all of the functionality of components 108, 110, 112, 114, 116, 118 and/or other components.

Processor 120 may be configured to provide information processing capabilities in server 102. As such, processor 120 may include a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. Processor 120 may be configured to execute components 108, 110, 112, 114, 116, 118 and/or other components. Processor 120 may be configured to execute components 108, 110, 112, 114, 116, 118, and/or other components by software; hardware; firmware; some combination of software, hardware, and/or firmware; and/or other mechanisms for configuring processing capabilities on processor 120.

It should be appreciated that although components 108, 110, 112, 114, 116, and 118 are illustrated in FIG. 1 as being co-located within a single processing unit, in implementations in which processor 120 includes multiple processing units, components 108, 110, 112, 114, 116, and/or 118 may be located remotely from the other components. The description of the functionality provided by the different components 108, 110, 112, 114, 116, and/or 118 described below is for illustrative purposes, and is not intended to be limiting, as any of components 108, 110, 112, 114, 116, and/or 118 may provide more or less functionality than is described. For example, components 108, 110, 112, 114, 116, and/or 118 may be eliminated, and some or all of its functionality may be provided by other ones of components 108, 110, 112, 114, 116, and/or 118. As another example, processor 120 may be configured to execute one or more additional components that may perform some or all of the functionality attributed below to one of components 108, 110, 112, 114, 116, and/or 118.

Figure 7:
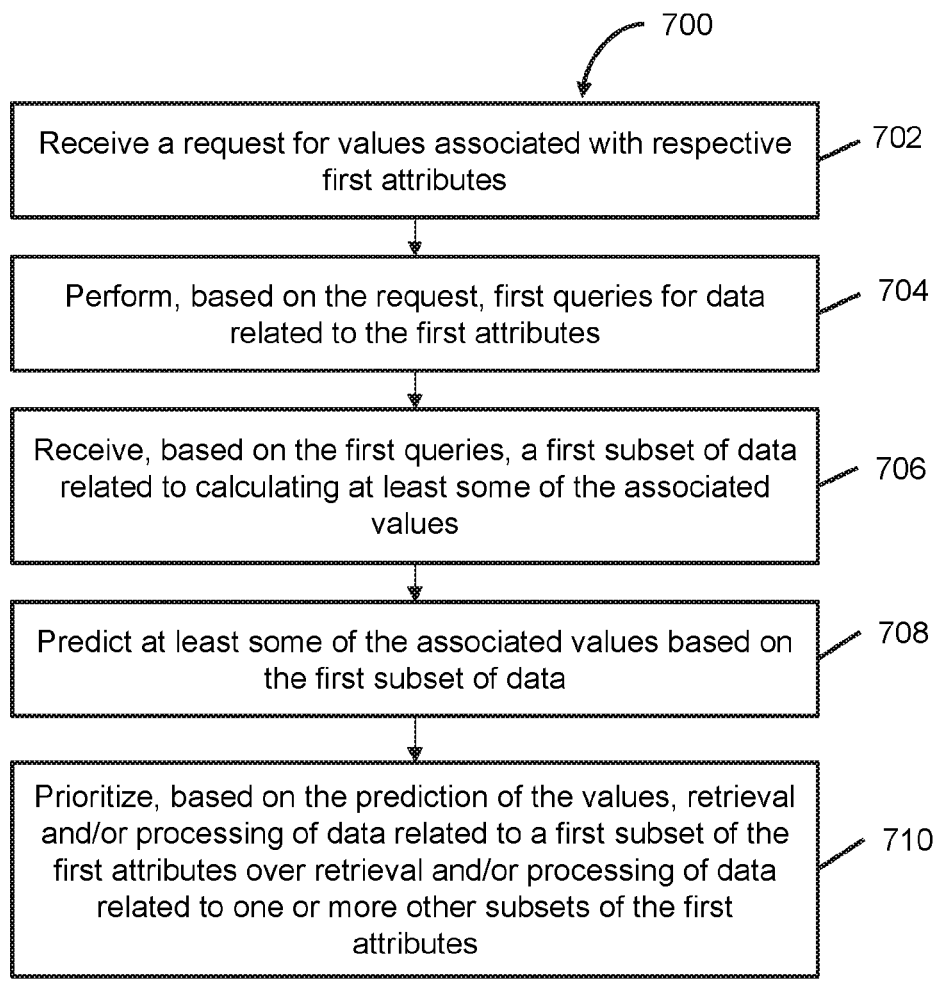
FIG. 7 illustrates a flowchart of processing operations for prioritizing retrieval and/or processing of data related to a subset of attributes based on a prediction of associated values, in accordance with one or more implementations.

FIG. 7 illustrates a flowchart of processing operations of prioritizing retrieval and/or processing of data, in accordance with one or more implementations. The operations of process 700 presented below are intended to be illustrative. In some implementations, process 700 may be accomplished with one or more additional operations not described, and/or without one or more of the operations discussed. Additionally, the order in which the operations of process 700 are illustrated in FIG. 7 and described below is not intended to be limiting.

In certain implementations, one or more operations of process 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 700 in response to instructions stored electronically on an electronic storage medium. The one or more processing devices may include one or more devices configured through hardware, firmware, and/or software to be specifically designed for execution of one or more of the operations of process 700.

In an operation 702, a request for values associated with respective first attributes may be received. Operation 702 may be performed by a data request component that is the same as or similar to data request component 108 in accordance with one or more implementations.

In an operation 704, first queries for data related to the first attributes may be performed. The first queries may be based on the request at operation 702. Operation 704 may be performed by a query component that is the same as or similar to query component 110, in accordance with one or more implementations.

In an operation 706, a first subset of data related to calculating at least some of the associated values may be received. The first subset of data may be received based on the first queries. Operation 706 may be performed by a query component that is the same as or similar to query component 110, in accordance with one or more implementations.

In an operation 708, at least some of the associated values may be predicted based on the first subset of data. Operation 708 may be performed by a value component that is the same as or similar to value component 112, in accordance with one or more implementations.

In an operation 710, retrieval and/or processing of data related to a first subset of the first attributes may be prioritized over retrieval and/or processing of data related to one or more other subsets of the first attributes. The prioritization may be based on the prediction of the associated values. Operation 710 may be performed by a prioritization component that is the same as or similar to prioritization component 114, in accordance with one or more implementations.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:
1. A computer-implemented method of prioritizing retrieval data related to a subset of attributes based on a prediction of associated values, the method being implemented by a computer system that includes one or more physical processors executing computer program instructions which, when executed, perform the method, the method comprising:

receiving, at the computer system, a request for values associated with respective first attributes;

performing, by the computer system, based on the request, first queries for data related to the first attributes;

receiving, at the computer system, based on the first queries, a first subset of data related to calculating at least some of the associated values;

predicting, by the computer system, at least some of the associated values based on the first subset of data, wherein the predicted values comprise first predicted values associated with a first subset of the first attributes and other predicted values associated with one or more other subsets of the first attributes;

performing, by the computer system, a first comparison that compares the first predicted values with the other predicted values; and prioritizing, by the computer system, retrieval of data related to the first subset of the first attributes over retrieval of data related to the one or more other subsets of the first attributes, wherein the prioritization is based on the first comparison indicating that the first predicted values associated with the first subset of the first attributes are greater than the other predicted values associated with the one or more other subsets of the first attributes with respect to a predefined presentation sorting order.

2. The method of claim 1, wherein the predicted values are associated with a second attribute and respective ones of the first attributes.

3. The method of claim 1, further comprising:
allocating, by the computer system, based on the prioritization, a greater amount of resources to retrieval of data related to the first subset of the first attributes than an amount of resources allocated to retrieval of data related to the one or more other subsets of the first attributes.

4. The method of claim 1, further comprising:
performing, by the computer system, based on the prioritization, second queries for data related to the first subset of the first attributes before performing further queries for data related to the one or more other subsets of the first attributes in addition to the first queries.

5. The method of claim 4, further comprising:
receiving, at the computer system, based on the second queries, a second subset of data related to calculating the values associated with the first subset of the first attributes; and
updating, by the computer system, based on the second subset of data, the first predicted values associated with the first subset of the first attributes.

6. The method of claim 5, further comprising:
performing, by the computer system, one or more other queries for data related to the one or more other subsets of first attributes;
receiving, at the computer system, based on the one or more other queries, one or more other subsets of data related to calculating the values associated with the one or more other subsets of the first attributes; and
updating, by the computer system, based on the one or more other subsets of data, the other predicted values associated with the one or more other subsets of the first attributes.

7. The method of claim 6, further comprising
comparing, by the computer system, the updated first predicted values associated with the first subset of the first attributes with the updated other predicted values associated with the one or more other subsets of the first attributes.

8. The method of claim 7, further comprising:
updating, by the computer system, based on the comparison, the first subset of the first attributes such that the updated first subset of the first attributes include at least one attribute that was not in the prior-to-update first subset of the first attributes; and
updating, by the computer system, the prediction of the values associated with respective ones of the first attributes included in the updated first subset of the first attributes that were not included in the prior-to-update first subset of the first attributes.

9. The method of claim 1, further comprising:
determining, by the computer system, based on the prediction of the associated values and priority criteria, which of the first attributes are to be included in the first subset of the first attributes, wherein the priority criteria relates to at least one of a first quantity of the first attributes or a sorting preference of the first attributes, such that at least one of: (i) the first subset of the first attributes includes no more than the first quantity of the first attributes; or (ii) the first subset of the first attributes includes respective ones of the first attributes that rank higher than other ones of the first attributes with respect to the sorting preference.

10. A system for prioritizing retrieval of data related to a subset of attributes based on a prediction of associated values, the system comprising:
one or more physical processors programmed to execute computer program instructions which, when executed, cause the computer system to:
receive a request for values associated with respective first attributes;
perform, based on the request, first queries for data related to the first attributes;
receive, based on the first queries, a first subset of data related to calculating at least some of the associated values;
predict at least some of the associated values based on the first subset of data, wherein the predicted values comprise first predicted values associated with a first subset of the first attributes and other predicted values associated with one or more other subsets of the first attributes;
perform a first comparison that compares the first predicted values with the other predicted values; and
prioritize retrieval of data related to the first subset of the first attributes over retrieval of data related to the one or more other subsets of the first attributes, wherein the prioritization is based on the first comparison indicating that the first predicted values associated with the first subset of the first attributes are greater than the other predicted values associated with the one or more other subsets of the first attributes with respect to a predefined presentation sorting order.

11. The system of claim 10, wherein the predicted values are associated with a second attribute and respective ones of the first attributes.

12. The system of claim 10, wherein the computer system is further caused to:

allocate, based on the prioritization, a greater amount of resources to retrieval of data related to the first subset of the first attributes than an amount of resources allocated to retrieval of data related to the one or more other subsets of the first attributes.

13. The system of claim 10, wherein the computer system is further caused to:
perform, based on the prioritization, second queries for data related to the first subset of the first attributes before performing further queries for data related to the one or more other subsets of the first attributes;
receive, based on the second queries, a second subset of data related to calculating the values associated with the first subset of the first attributes; and
update, based on the second subset of data, the first predicted values associated with the first subset of the first attributes.

14. The system of claim 13, wherein the computer system is further caused to:
perform one or more other queries for data related to the one or more other subsets of first attributes;
receive, based on the one or more other queries, one or more other subsets of data related to calculating the values associated with the one or more other subsets of the first attributes;
update, based on the one or more other subsets of data, the other predicted values associated with the one or more other subsets of the first attributes; and
compare, by the computer system, the updated first predicted values associated with the first subset of the first attributes with the updated other predicted values associated with the one or more other subsets of the first attributes.

15. The system of claim 14, wherein the computer system is further caused to:
update, based on the comparison, the first subset of the first attributes such that the updated first subset of the first attributes include at least one attribute that was not in the prior-to-update first subset of the first attributes; and
update the prediction of the values associated with respective ones of the first attributes included in the updated first subset of the first attributes that were not included in the prior-to-update first subset of the first attributes.

16. The system of claim 10, wherein the computer system is further caused to:
determining, by the computer system, based on the prediction of the associated values and priority criteria, which of the first attributes are to be included in the first subset of the first attributes, wherein the priority criteria relates to at least one of a first quantity of the first attributes or a sorting preference of the first attributes, such that at least one of: (i) the first subset of the first attributes includes no more than the first quantity of the first attributes; or (ii) the first subset of the first attributes includes respective ones of the first attributes that rank higher than other ones of the first attributes with respect to the sorting preference.

17. A computer-implemented method of prioritizing processing of data related to a subset of attributes based on a prediction of associated values, the method being implemented by a computer system that includes one or more physical processors executing computer program instructions which, when executed, perform the method, the method comprising:
receiving, at the computer system, a request for values associated with respective first attributes;
performing, by the computer system, based on the request, first queries for data related to the first attributes;
receiving, at the computer system, based on the first queries, a first subset of data related to calculating at least some of the associated values;
predicting, by the computer system, at least some of the associated values based on the first subset of data, wherein the predicted values comprise first predicted values associated with a first subset of the first attributes and other predicted values associated with one or more other subsets of the first attributes;
performing, by the computer system, a first comparison that compares the first predicted values with the other predicted values; and
prioritizing, by the computer system, processing of data related to the first subset of the first attributes over processing of data related to the one or more other subsets of the first attributes, wherein the prioritization is based on the first comparison indicating that the first predicted values associated with the first subset of the first attributes are greater than the other predicted values associated with the one or more other subsets of the first attributes with respect to a predefined presentation sorting order.

18. The method of claim 17, further comprising:
performing, by the computer system, based on the prioritization, second queries for data related to the first subset of the first attributes before performing further queries for data related to the one or more other subsets of the first attributes in addition to the first queries;
receiving, at the computer system, based on the second queries, a second subset of data related to calculating the values associated with the first subset of the first attributes;
updating, by the computer system, based on the second subset of data, the first predicted values associated with the first subset of the first attributes;
performing, by the computer system, a second comparison that compares the updated first predicted values associated with the first subset of the first attributes with a version of the other predicted values associated with the one or more other subsets of the first attributes; and
reprioritizing, by the computer system, based on the second comparison, processing of data related to the first attributes such that processing of data related to at least one attribute of the one or more subsets of the first attributes is caused to be prioritized over processing of data related to at least one attribute of the first subset of the first attributes.

19. The method of claim 18, further comprising:
performing, by the computer system, based on the reprioritization, third queries for data related to at least one attribute of the one or more subsets of the first attributes before performing further queries for data related to at least one attribute of the first subset of the first attributes in addition to the first queries and the second queries.

20. The method of claim 17, further comprising:
updating, by the computer system, based on the prioritization, the first predicted values associated with the first subset of the first attributes before updating the other predicted values associated with the one or more other subsets of the first attributes.

* * * * *